United States Patent [19]

Stähle

[11] Patent Number: 4,829,420
[45] Date of Patent: May 9, 1989

[54] PROCESS AND CIRCUIT ARRANGEMENT FOR ADDRESSING THE MEMORIES OF A PLURALITY OF DATA PROCESSING UNITS IN A MULTIPLE LINE SYSTEM

[75] Inventor: Peter Stähle, Paderborn-Dahl, Fed. Rep. of Germany

[73] Assignee: Nixdorf Computer AG, Paderborn, Fed. Rep. of Germany

[21] Appl. No.: 65,120

[22] Filed: Jun. 29, 1987

Related U.S. Application Data

[63] Continuation of Ser. No. 569,785, Jan. 11, 1984, abandoned.

[30] Foreign Application Priority Data

Jan. 11, 1983 [DE] Fed. Rep. of Germany ....... 3300699

[51] Int. Cl.⁴ .................. G06F 12/06; G06F 15/16
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,292,151 | 12/1966 | Barnes et al. | 364/200 |
| 3,323,109 | 5/1967 | Hecht et al. | 364/200 |
| 3,555,513 | 1/1971 | Hauck et al. | 364/200 |
| 4,001,786 | 1/1977 | Boehm | 364/200 |
| 4,025,903 | 4/1977 | Kaufman et al. | 364/200 |
| 4,030,073 | 6/1977 | Armstrong, Jr. | 364/200 |
| 4,040,029 | 8/1977 | Young | 364/900 |
| 4,096,571 | 6/1978 | Vander Mey | 364/200 |
| 4,128,881 | 12/1978 | Yamamoto et al. | 364/200 |
| 4,155,119 | 5/1979 | De Ward et al. | 364/200 |
| 4,189,767 | 2/1980 | Ahuja | 364/200 |
| 4,236,207 | 11/1980 | Rado et al. | 364/200 |
| 4,285,039 | 8/1981 | Patterson et al. | 364/200 |
| 4,318,175 | 3/1982 | Hawley | 364/200 |
| 4,365,294 | 12/1982 | Stokken | 364/200 |
| 4,366,537 | 12/1982 | Heller et al. | 364/200 |
| 4,392,200 | 7/1983 | Arulpragasam et al. | 364/200 |
| 4,398,248 | 8/1983 | Hsia et al. | 364/200 |
| 4,404,628 | 9/1983 | Angelo | 364/200 |
| 4,571,676 | 2/1986 | Mantellina et al. | 364/200 |
| 4,679,167 | 7/1987 | Finnell | 364/900 |

OTHER PUBLICATIONS

J. Adair et al., "Memory Address Relocation Using Full Adder", IBM Technical Disclosure Bulletin, vol. 25, No. 3B, pp. 1766–1767 (Aug. 1982).

Primary Examiner—Gary V. Harkcom
Assistant Examiner—Christopher H. Lynt
Attorney, Agent, or Firm—Cullen, Sloman, Cantor, Grauer, Scott & Rutherford

[57] ABSTRACT

A process and a circuit arrangement for the automatic direct addressing of any desired memory location in the memories of a plurality of data processing units interconnected through a common bus by use of a single-step addressing technique is disclosed. The size of the memories used in the various processing units may be different. Addresses may be internally stored in the memories according to one of two addressing schemes. In a data processing unit initiating a data transmission connection, the external memory address of the desired memory location to be addressed is generated from an internally stored address and is transmitted to the bus system. This external address is received in each data processing unit, which performs an address calculation to determine whether the specified external address is within its volume or range of addresses.

20 Claims, 3 Drawing Sheets

PROCESS AND CIRCUIT ARRANGEMENT FOR ADDRESSING THE MEMORIES OF A PLURALITY OF DATA PROCESSING UNITS IN A MULTIPLE LINE SYSTEM

This application is a continuation of co-pending U.S. patent application Ser. No. 569,785, filed on Jan. 11, 1984 now abandoned.

INTRODUCTION AND BACKGROUND OF THE INVENTION

A multiple line system to which a plurality of data processing units are connected can also be designated as a multicomputer system when the data processing units involved are computers. In order to simplify the following description, a data processing unit which can be switched into a multiple line system is also designated as a processor, although the switching in of other types of data processing units is also conceivable. Moreover, the multiple line system will be designated in the following as a "bus" in accordance with the terminology familiar to one skilled in the art.

An internal memory can belong to a data processing unit or processor connected to a bus. Moreover, external memories can also be connected to a bus, which memories represent a data storage unit which as memories can correspond (that is, communicate) with processors or computers connected with the bus as well as with DMA (direct memory access) units which are likewise connected with the bus. A DMA unit contains a DMA device for direct memory access as well as a related device control. It is connected with a data terminal unit at which data are input or output or displayed.

All of these data processing units can correspond with one another by way of the bus, that is, exchange information which must always finally be transferred by a transmitting unit and stored by a receiving unit. For this memory addressing is required, for which purpose a transmitting unit generates an address signal and passes this on to the bus, which is transferred by the bus and goes to one or a plurality of other units, where after it is received it is verified whether the address information transmitted with it belongs to the address range of the respective memory which is present on the receiving unit. If this is not the case, then no further information is sent to the receiving unit. If the address information, however, is within the address range of the memory of a receiving unit, then the unit selected by the address signal is reached, and the memory of this unit can then receive further information to be transmitted from the transmitting unit by way of the bus.

Up to now the internal memories of processors which are connected with a multiple line system have been selectively addressed in such a way that one address word represents the address of the desired processor and another address word then represents the address of a storage location of the internal memory present in this processor. A disadvantage of such an addressing process consists in the time required for the two-step addressing. Besides this the two-step multiple line system must be specially built, since either successive time intervals requiring corresponding time control of the addressing, or, for parallel transmisson of the different address segments, individually assigned wire conductors are required. Another disadvantage consists on the special control complexity required for two different address segments in making connection with a desired memory.

BRIEF SUMMARY OF THE INVENTION

The solutions to the foregoing problems offered by the present invention reduce the time consumption and circuit complexity required for generating address and control signals and provide the capability of addressing the memories of a plurality of data processing units connected to one multiple line system so that an automatic direct addressing of the respective memory desired is achieved with no additional complexity of lines or circuit engineering for the transmisson of control signals.

A process of the type mentioned at the outset is constructed according to the invention for the solution of this problem in such a way that each of the data processing umits can directly generate the addresses of the memory cells of all memories of data processing units relative to a continuous total address range of all memories beginning with the starting address of the memory of the first data processing unit, and that in each data processing unit the result is a reduction in the received address or in the address to be fed to its own memory by the amount of the external starting address applying to this memory.

When the address ranges, which may be different in quantity, of the memories of the data processing units are continuously arranged in series, then a total address range is formed the quantity of which is the sum of all the individual address ranges. If each data processing unit connected with the multiple line system can generate all of the possible addresses within this total address range, then the direct selection of each memory cell present in the system is possible. Though the address words for this are relatively long, they can be transmitted in a single control step, not in two as was previously required for the separate addressing of the respective data processing unit desired and of the memory connected with it. In view of this advantage, an address length perhaps greater than the previously existing two-part address is hardly of great importance.

Various methods for carrying out the process according to the invention may be considered which can respectively be used depending on the special requirements with regard to circuit complexity or system structure. Two such possibilities or solution routes are explained further below on the basis of the figures. One of the possible solution routes may generally be described as a process for addressing the memory, (that is, the entire address volume or range) of a plurality of data processing units in a multiple line system, wherein a data processing unit initiating a data transmission connection generates and transmits to the bus and the address of a memory cell in the memory of a desired data processing unit. This address is received by each data processing unit and is verified as to its belonging to the address range or volume of the respective memory. This process of the present invention is characterized by the fact that each of the data processing units can directly generate the addresses of the memory cells of all memories of the data processing units relative to a continuous address range or volume of all memories beginning with the starting address of the memory of the first data processing unit, and that, in each data processing unit there is a reduction in the addresses received or to be fed to its own memory, by an amount or value corresponding to the external starting address of its own memory.

A further reduction in the complexity of circuit engineering can be achieved by assigning a specific format to using the second development or solution route. This second process is characterized by each data processing unit generating the addresses of the memory cells of all memories relative to a continuous total address range or volume beginning with the internal starting address of its own memory, and by the respective addresses thus generated then being increased by the amount of the external starting address of its own memory before being passed on into the data processing unit. Here the address to be delivered by one data processing unit is formed in a very definite format before it is passed on by way of the bus. This is possible because within the continuous total address range, the address range of the memory of the transmitting data processing unit has a certain definite position, since the total address range is formed by arranging in series the individual address ranges. So if the total address range, as seen from each individual data processing unit, starts with the starting address of the memory belonging to that unit, then the address, generated in that unit, of a memory cell in another data processing unit is referenced to this starting address. Thus, each memory cell of all of the memories in the system will be selected by an address dependent on the position of the respective processor in the system. Yet, this results in an ambiguity in the addressing of the memory cells. In order to remove this ambiguity, the respective address to be delivered must be converted in the transmitting data processing unit in such a way that when transmitted by way of the bus it will be interpreted in only one of the other data processing units as the selecting address for the memory belonging to it. To accomplish this, the address to be transmitted, which is initially referenced to the internal starting address of the memory of the transmitting processor, is increased by the value of the external starting address of this memory, i.e., the memory of the transmitting processor. This external starting address, however, is based on a total address range beginning with the starting address of the memory of the first data processing unit. The address thus increased is then transmitted by way of the bus and is referenced in any case to a total address range which, as seen from the bus, is the same for all data processing units and has the same starting address. When the address thus transmitted reaches the data processing unit which is ready to receive, then it is verified there. This verification takes place by reducing the address received in each data processing unit. This reduction is in the amount which corresponds to the external starting address which is determinative for the memory of the respective verifying data processing unit.

As is yet to be described on the basis of an embodiment example, by this process, in every case, there is an unequivocal and direct selection of the respective desired memory cell without any additional multi-step control operations. The address generated runs through only an addition or subtraction step in the processor before the transmission or after the reception, without expensive multi-step decodings or preaddressings or address assignments being necessary.

Further developments of the invention as well as circuits for carrying it out are to be seen in the following description of the figures.

BEST MODE FOR CARRYING OUT THE INVENTION

Figure 1:
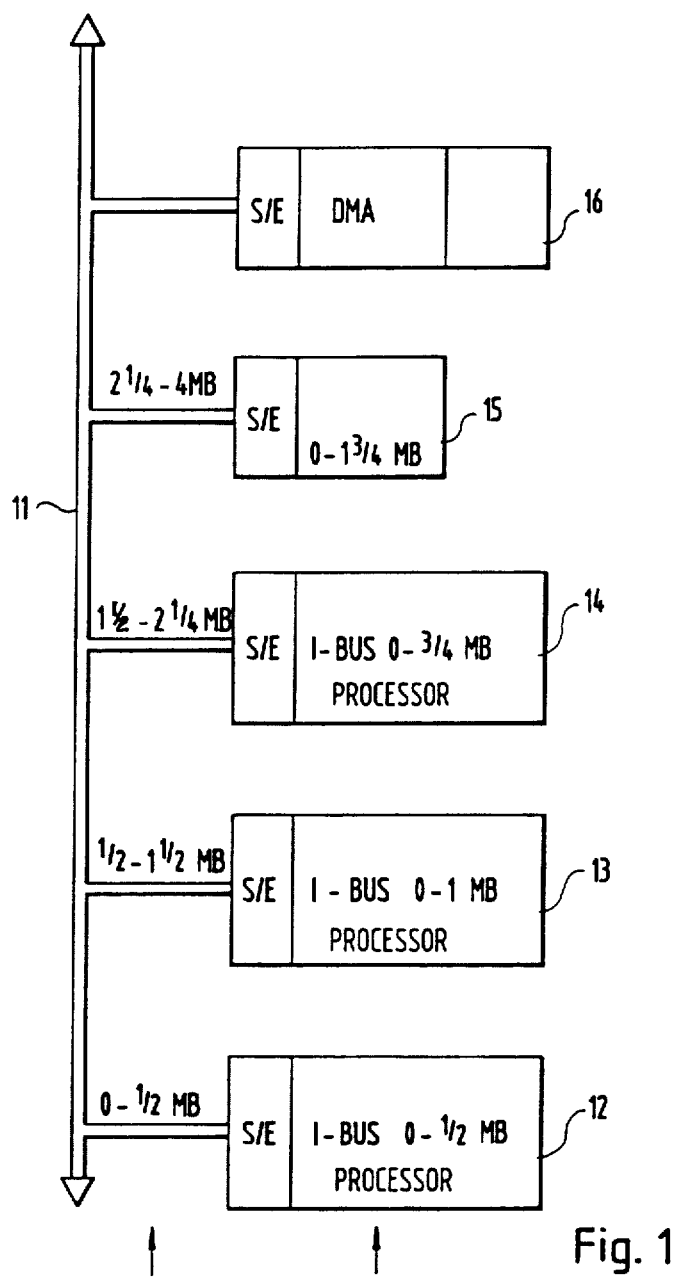
FIG. 1 shows the general design of a multiple line system with data processing units.

FIG. 1 represents the general design of a multiple line system which includes a bus 11 and a plurality of data processing and data storing units 12 to 16. These may come into connection with one another by way of the bus 11 and exchange information. The units 12 to 16 may involve differently designed units. Thus for example, the units 12, 13 and 14 are processor units which respectively contain signal transmitters and signal receivers S/E, a processor, an internal memory and an internal bus. The unit 15 is a nonlocal memory unit and contains signal transmitters and signal receivers S/E as well as a nonlocal memory. The unit 16 is a DMA unit and contains signal transmitters and signal receivers S/E as well as a DMA control for direct access to the memory, which in turn may be in connection with a data terminal. The bus 11 consists of a plurality of signal lines by way of which any kind of correspondence of two or a plurality of data processing units with one another is possible. Each data processing unit 12 to 16 can select the memory of another data processing unit in order to exchange information with this memory, if necessary in consultation with its own memory. For this the memory of a receiving unit which is desired by a transmitting unit must be addressed, for which the addressing process to be described in the following is carried out.

For this the organization of the address ranges of the individual units will be explained. As FIG. 1 shows, an external address region is provided between the individual units 12 to 15 and the bus 11. This external address region has a total address range which, for the example shown in FIG. 1, has an extent of 0 to 4 Mbytes. This total address range is composed of the individual address ranges of the units 12 to 15, assuming that the unit 12 has an internal address range of 0 to ½ megabyte, the unit 13 has an internal memory with an address range of 0 to 1 Mbyte, the unit 14 has an internal memory with an address range of 0 to ¼ Mbyte, and the unit 15 has a nonlocal memory with an address range of 0 to 1¾ Mbytes. The unit 16 contains no internal memory since it is a DMA unit.

It can be recognized from FIG. 1 that the individual address ranges of the units 12 to 15 as a whole form an address range of 0 to 4 Mbytes, which represents the external address region. The internal address region is determined by the internal address range for the respective units 12 to 15. Within this internal address range the processor can correspond with the related internal memories by way of the internal bus (I bus).

Figure 2:
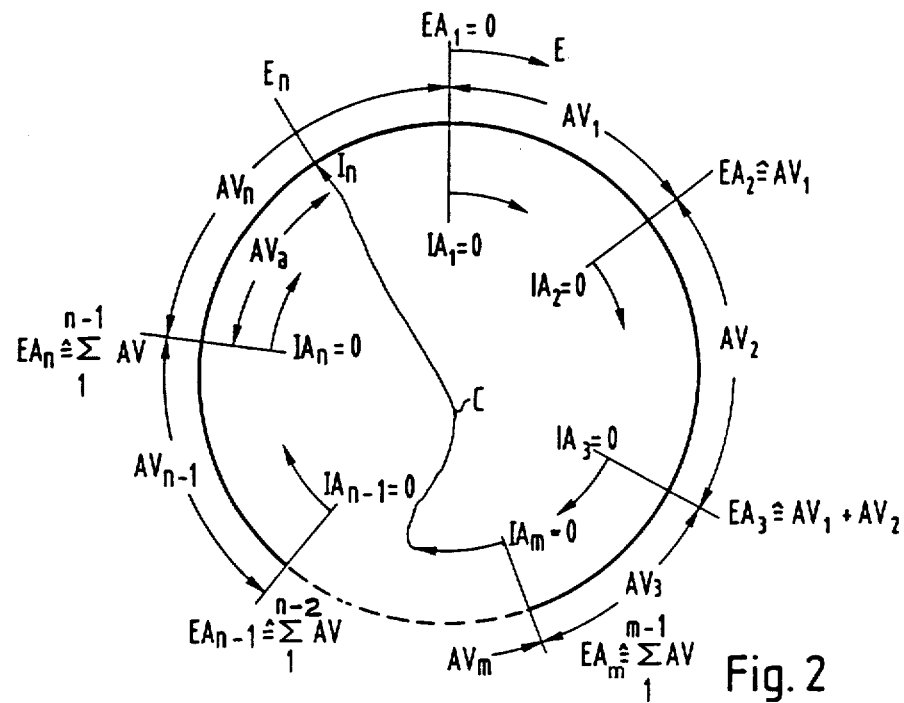
FIG. 2 shows a basic diagram of the address generation used in the process according to the invention.

It will now be explained on the basis of FIG. 2 how the addressing of the memory of a data processing unit by a transmitting unit takes place by way of the bus, by the use of the process according to the invention. For this, FIG. 2 shows a diagrammatic circular representation of a total address range which is composed of individual address ranges $AV_1$, $AV_2$, $AV_3$ ... $AV_{N-1}$, $AV_n$. For the total address range $$\sum_1^n AV$$

there is an external starting address $EA_1$ which, for example, is the initial address. The total address range compiled in the direction of the arrow E shown in FIG. 2 can be understood as the sum of the address ranges of the individual data processing units, as is shown at 12 to 15 in FIG. 1. In this representation an external starting address EA is indicated for each address range AV, which EA corresponds to the address range for the external address region formed by the total address range, which is respectively prearranged on the circle in the direction of the arrow E. Thus for example, the external starting address $EA_2$ is equal to the value of the address range $AV_1$, and the starting address $EA_3$ is equal to the value of the previous address ranges, namely the sum of $AV_1 + AV_2$. In general, then, the following equation applies:

$$EA_m = \sum_1^{m-1} AV.$$

FIG. 1 also shows internal starting addresses for each individual address range AV. Each internal starting address has the value of 0.

Now if each of the data processing units 12 to 15 (FIG. 1) is capable of generating a number of addresses which corresponds to the total address range, as is represented for example in FIG. 2, then it is possible, in the manner to be described below, to select directly each memory cell in the whole of the data processing units. Here it may be assumed for example that, according to the connection route C denoted diagramatically in FIG. 2, a memory cell in the address range $AV_n$ is to be addressed from a data processing unit with the address range $AV_m$. The memory cell to be addressed has the internal address $I_n$ and the external address $E_n$.

Since each data processing unit is capable of generating a number of addresses equal to the total address range, and since in each data processing unit, in a manner yet to be described, there is an information record regarding in what position its address range is arranged in relation to the total address range, the data processing unit with the address $AV_m$ can generate an address which on the basis of the internal starting address $IA_m$ has a value which corresponds to the sum of the address ranges in the direction of rotation shown by the arrow E in FIG. 2 up to the external address $E_n$ or $I_n$. The value of this address is then $$\sum_m^{n-1} AV + AV_a$$

In order for this value to be arranged in order in the external address region and to be able to be utilized unequivocally for selecting the memory cell within the address $AV_n$ with the internal address $I_n$, it must be referenced to the external starting address $EA_1$. This is achieved by having the address, generated in the manner described above, increased in the transmitting data processing unit by the amount of the external starting address $EA_m$, and by having this thus increased address then transmitted by way of the bus 11 (FIG. 1).

In each of the data processing units connected with the bus 11, the address which appears on the bus 11 (which has been increased in the transmitting data processing unit by the amount of its external starting address $EA_m$) is then reduced by the amount of the external starting address which corresponds to that respective data processing unit. In the case of the unit with the address volume $AV_n$, the following calculation then results:

$$\sum_m^{n-1} AV + AV_a + \sum_1^{m-1} AV - \sum_1^{n-1} AV = AV_a$$

Thus, as a result of these steps described above, the value $AV_a$ remains left over in the data processing unit with the address volume $AV_n$ and exactly corresponds to the value of the selected internal address $I_n$.

Figure 3:
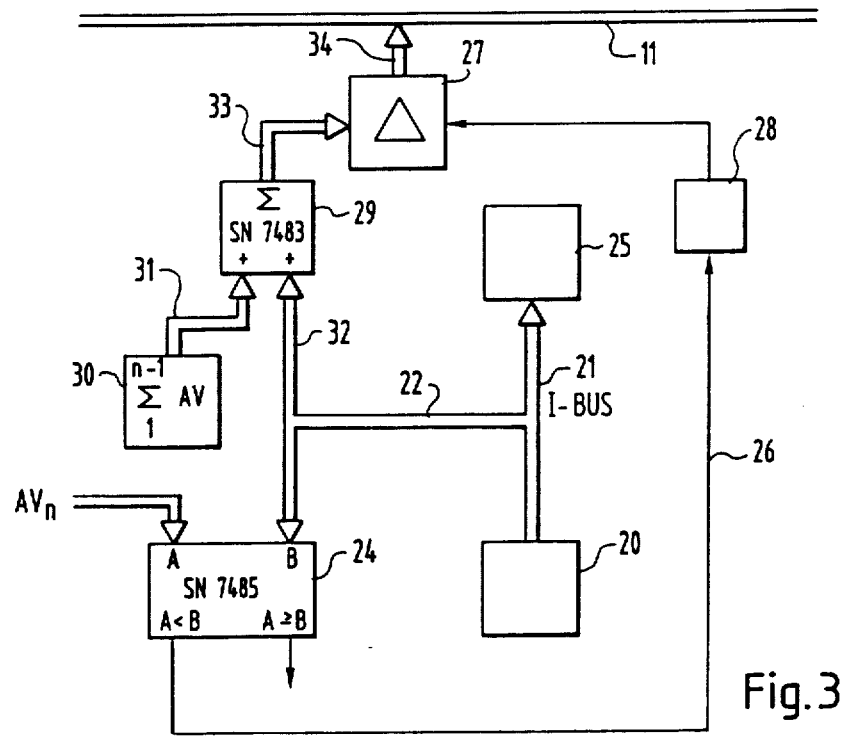
FIG. 3 shows an example of a circuit for carrying out the invention according to a first embodiment of a transmitting data processing unit.
Figure 4:
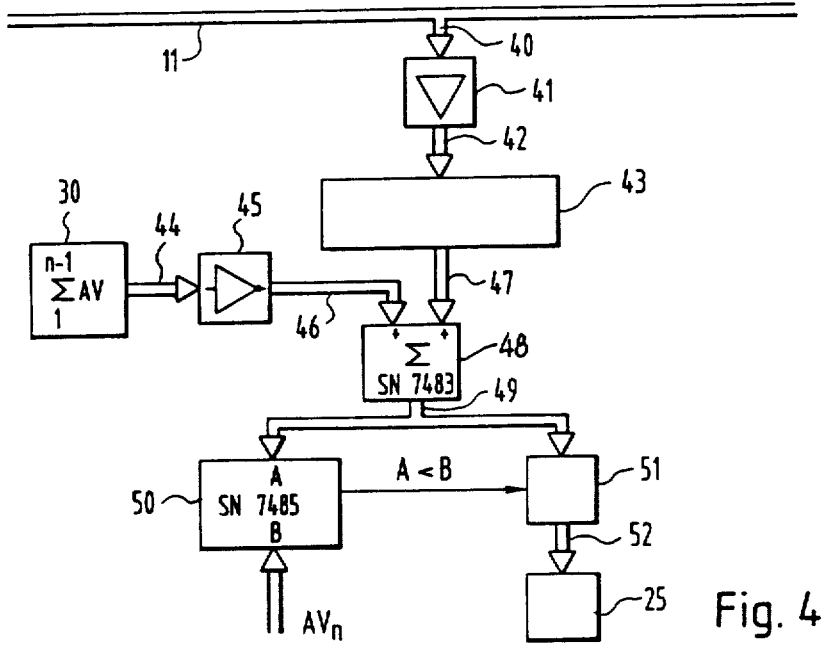
FIG. 4 shows an example of a circuit for carrying out the first embodiment of the invention in a receiving data processing unit.

In the following is described, on the basis of FIGS. 3 and 4, the operation of circuits by which the process according to the invention can be carried out without a data processing unit one of the units 12 to 14 shown in FIG. 1. FIG. 3 shows the part of a data processing unit relevant to the transmission of an address and FIG. 4 shows the part of it relevant to the receiving of an address, which unit may have the address range $AV_n$ within the total address range shown in FIG. 2. This unit contains a processor 20 and an internal memory 25 and is connected with the bus 11 by way of signal channels 34 and 40.

If the data processing unit is to come into connection with another data processing unit by way of the bus 11, then the exchange of information occurring thereby must be initiated by having the processor 20 generate the address of a memory cell or of a memory section of another data processing unit. This address is transmitted to the internal bus 21, by way of which the processor can correspond directly with the internal memory 25, also by means of internal addresses. Then by way of the signal channel 22 the address also reaches the input B of a comparator 24 of the SN7485 type, the input A of which has fed to it a value which corresponds to the address range $AV_n$ of the internal memory 25. Besides this, the address generated by the processor 20 is fed over the signal channel 32 to one input of an adder circuit 29 of the SN7483 type, the other input of which is fed by way of a signal channel 31 with a value which corresponds to the sum of the address ranges of the foregoing data processing units or their internal memories in the order shown in FIG. 2. This value is permanently set in the data processing unit, for which purpose a device 30 serves, which can also be designated as a coding switch. Such a coding switch may be a mechanically or electronically operating switch arrangement which, during the installation of the data processing unit, can be set at a value which, in the manner already described, corresponds to the starting address of the internal memory 25.

The comparator 24 decides whether the address fed to it by way of its input B fits in the address volume $AV_n$ of the data processing unit or not. If it has a greater value than the address range $AV_n$, then a control signal is delivered by way of the output A<B of the comparator 24, which signal characterizes an external memory access. If the result of the comparison is less than or equal to the address volume $AV_n$, then a control signal is delivered by way of the output A≧B which signal characterizes an internal access, which is to say that the processor 20 can correspond directly with the internal memory 25.

The control signal delivered by way of the signal channel 26, by way of a sequence control 28 reaches a transmitting circuit 27 which is also to be designated as a bus driver. The control signal clears the output of the sum of the addresses generated which is formed in the adder circuit 29 and the value generated with the device 30, so that the sum addresses formed which are fed through the signal channel 33 to the bus driver 27 can be passed on by way of the signal channel 34 to the bus 11.

The sequence control circuit 28 generates a prescribed coordination with time of the through-connection of the bus driver 27 in accordance with the special manner of operation of the multiple line system, so that the addresses transmitted by way of the signal channel 34 to the bus 11 are passed on in coordination or synchronization with the bus operation.

The receiving of an address which was transmitted over the bus 11 takes place with the circuit shown in FIG. 4. The address signals go by way of the signal channel 40 to reach a signal receiver 41 which, after amplification if necessary, feeds them by way of a signal channel 42 to an address register 43. From the address register 43 the address is fed by way of the signal channel 47 to a summing circuit 48 of the SN7483 type, which makes a subtraction by the amount of a value which corresponds to the starting address of the internal memory 25. This value has already been discussed on the basis of FIG. 3 and it is fed from the device 30 by way of a signal channel 44 as well as an inverter 45 and a signal channel 46 to the summing circuit 48. The inverter 45 by inverting causes the summing circuit to make a subtraction, so that, as it is output, an address is delivered by way of the signal channel 49 which corresponds to the address received by way of the bus 11 minus the value generated in the device 30. This reduced address reaches a comparator 50 of the SN7485 type with which it is ascertained whether the address fits in the address range $AV_n$ which is provided for the internal memory 25. If this is the case, then at the output A<B of the comparator 50 a control signal is delivered which opens a gate circuit 51, so that the address received then reaches the internal memory 25 by way of a signal channel 52.

If the comparator 50 ascertains that the address received does not fit in the address range $AV_n$, then the gate circuit 51 is not opened, so that the internal memory 25 cannot be selected. Such a selection then takes place in one of the other data processing units in the address range of which the received address fits. In this manner the choosing of the respective correct data processing unit takes place automatically.

The apparatus 30 may, as described be a mechanical or electronic coding switch. It may also be constructed as a register which can be set from any desired position on the multiple line system. Then for example it is possible by program control to change the respective value generated with the device 30 and to shift the position of the data processing units within the sequence shown in FIG. 2.

Figure 5:
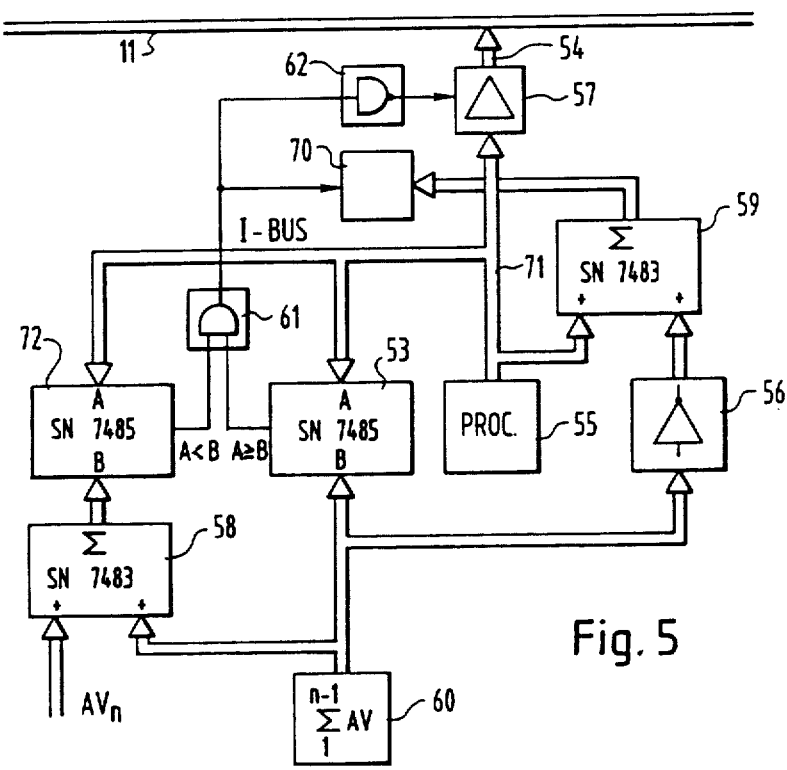
FIG. 5 shows an example of a circuit for carrying out the process according to a second embodiment of a transmitting data processing unit.

FIG. 5 represents a circuit arrangement which operates by a second embodiment of the invention and is provided for the transmission of an address. It is possible for an address transmitted with this circuit arrangement to be received with the circuit arrangement shown in FIG. 4.

The circuit arrangement represented in FIG. 5 operates by a principle by which each data processing unit of the multiple line system considers the addresses of the memory cells of all the memories as belonging to a continuous address area which starts with the starting address of the memory of the first data processing unit in the system.

With this organization, the address range of the respective memory of a data processing unit forms a window within the total address, range of all of the memories which window for example starts with the starting address $$\sum_{1}^{m-1} AV$$

for the diagram shown in FIG. 2 with the address volume $AV_m$ and extends to the end address $$\sum_{1}^{m} AV.$$

With this organization, the internal addresses of the data processing units agree with the external addresses which are transmitted over the bus.

FIG. 5 in turn represents the bus 11 on which addresses are to be transmitted with the circuit arrangement shown. The circuit arrangement is connected with the bus 11 by way of a signal channel 54, wherewith a transmitting circuit 57 is provided as in the circuit arrangement shown in FIG. 3. In order to initiate communication with a memory, the processor 55 generates an address which is fed by way of the internal bus 71 of the transmitting circuit 57 to two comparators 72 and 53 and by way of an adder circuit 59 to the internal memory 70. There is also a device 60 with which the value $$\sum_{1}^{n-1} AV$$

can be delivered as with the circuit arrangement according to FIG. 3. This value is fed to the comparator 53 as a comparative value, to the adder circuit 58 as a first addend and to an inverter 56 which after inverting it feeds it as the second addend to the adder circuit 59.

The second addend for the adder circuit 58 is the value $AV_n$, which corresponds to the address range of the inernal memory 70.

The comparators 72 and 53 are of the SN7485 type, and the adder circuits 58 and 59 are of the SN7483 type.

The address generated by the processor 55 is compared in the comparator 53 with the value $$\sum_{1}^{n-1} AV$$

which is delivered by the device 60. This value corresponds to the external starting address of the internal memory 70. The external end address of this memory 70 corresponds t the sum of the value delivered by the device 60 and the value $AV_n$ which is formed by the adder circuit 58. This sum is fed as a comparative value to the comparator 72 which likewise makes a comparison with the address delivered by the processor 55. If this address falls within the address range of the internal memory 70, then the output $A \geq B$ of the comparator 53 and the output $A < B$ of the comparator 72 deliver a logic 1 signal to an AND gate 61 which upon being triggered in this way delivers a control signal to the internal memory 70. The memory 70 is so that the latter can be selected with the address generated by the processor 55. The memory 70 is selected with the address from processor 55 after the inverted value of the external starting address is first subtracted from this address with the adder circuit 59. The control signal for the internal memory 70 is also fed to an inverter 62 which prevents the transmitting circuit 57 from transmitting the address delivered by the processor 55 to the bus 11.

If the address generated by the processor 55 lies outside of the address range of the internal memory 70, then either the output $A \geq B$ of the comparator 53 or the output $A < B$ of the comparator 72 or both outputs deliver a logic 0 signal to the AND gate 61. The latter then in turn delivers a logic 0 signal to the inverter 62 which thereby switches the transmitting circuit 57 to be active so that the address delivered by the processor 55 reaches the bus 11 and can be transmitted to another data processing unit or to a circuit arrangement of the type shown in FIG. 4. At the same time the internal memory 70 is inhibited by the logic 0 signal of the AND gate 61 from receiving the address from the adder circuit 59.

I claim:

1. In an information processing system having a plurality of data processing units, each unit including an internal memory having a plurality of uniquely addressed storage locations within an internal address range associated therewith and also within an external ddress range which is part of an external address continuum having external addresses which are associated with and are to be used to identify the storage locations in the internal memories, including starting and ending locations of the internal memories within the continuum, and having a common multiple line bus interconnecting the units to allow communication of information between the units, a process of accessing a particular storage location in any one of said internal memories, comprising the steps of:
    providing, in each of the data processing units, address generating means for generating directly any desired external address in said external address continuum such that any given memory location in any of the internal memories in the other units in the system can be uniquely addressed thereby if desired;
    in one of the data processing units, operating said address generating means to generate and place the external address of the particular storage location to be accessed on the bus so that one or more of the units receive it;
    in each respective unit which receives the external address placed on the bus, (1) subtracting from the received external address a value equal to the external address of the starting storage location of the internal memory of the unit, (2) comparing the result of the subtraction with the internal address range of the internal memory of the unit, and (3) when the result is within such internal address range, enabling access to the internal memory of the unit.

2. A process as in claim 1, wherein the address generating means generates the external address it places on the bus by obtaining an address of the particular storage location to be accessed from within its unit, and adding to the obtained address a value equal to the external address of the starting location of the internal memory of its unit.

3. A process as in claim 2, wherein the obtained address for the particular storage location to be accessed is expressed relative to the external address continuum beginning with the internal starting address of its own memory.

4. A process as in claim 1, wherein during the operating step, the address generating means determines whether the particular storage location to be accessed is within the internal memory of its unit, said determination being made at least in part through the use of a value corresponding to the size of the internal memory of its unit.

5. A process as in claim 4, wherein:
    when the address generating means determines that the particular storage location to be accessed is not within the internal memory of its unit it places the external address of the particular storage location to be accessed on the bus, and
    when address generating means determines the particular storage location to be accessed is within the internal memory of its unit, it feeds an internal address corresponding to the particular location to be accessed to the internal memory of its unit.

6. A process as in claim 1, wherein the external address placed on the bus by the address generating means is identical to the internal address of the particular storage location to be accessed used within the unit.

7. A process as in claim 6, wherein during the operating step, the address generating means determines whether the particular storage location to be accessed is within the internal memory of its unit, said determination being made by comparing the external address of the particular storage location to be accessed with values corresponding to the external addresses of the starting location and ending location of the internal memory of its unit.

8. A process as in claim 7, wherein:
    when the address generating means determines that the particular storage location to be accessed is not within the internal memory of its unit it places said external address of the particular storage location to be accessed on the bus, and
    when address generating means determines the particular storage location to be accessed is within the internal memory of its unit, it feeds an internal address corresponding to the particular location to be accessed to the internal memory of its unit.

9. A process as in claim 8, wherein the internal address fed to the internal memory is calculated by subtracting from the external address of the particular storage location to be selected a value equal to the external address of the starting location of the internal memory of the unit including the address generating means.

10. An improved information processing system having a plurality of data processing units and a common multiple line bus interconnecting the units to allow communication of information between the units, the improvement comprising in combination:

each data processing unit including
  (a) an internal memory provided with a plurality of uniquely addressed storage locations within an internal address range associated therewith beginning with internal address zero, and also within an external address range which is part of an external address continuum having external addresses which are associated with and used to identify the storaage locations in the internal memories of the plurality of data processing units, including starting locations of the internal memories within the continuum,
  (b) address generating means for providing access to the internal memories of the other units by generating an external address outside the external address range of its own internal memory by adding to an address referenced to address zero of its own internal memory a value equal to the external address of the starting location of its own internal memory, and
  (c) means for receiving external addresses from the bus, including means for determining whether each received external address corresponds to an address within the external address range of its own internal memory, said determining means including means for subtracting from each received external address a value equal to the external address of the starting storage location of its own internal memory unit.

11. A system as in claim 10, wherein in each data processing unit the determining means also includes means for comparing the result of its subtraction with the internal address range of its own internal memory, and means for enabling access to its own memory when the result is within such internal address range.

12. A system as in claim 10, wherein in each data processing unit the address generating means includes means for comparing the address referenced to address zero of its own memory with the internal address range of its own internal memory, means for enabling access to its own internal memory when such comparison indicates the address referenced is an address within such internal address range, and means for enabling access to the bus when such comparison indicates the address referenced is outside of such internal address range so that the external address outside the range of its own internal memory is applied to the bus.

13. A system as in claim 10 wherein in each data processing unit the receiving means includes with a device for generating a value corresponding to the external address of the starting storage location of its own internal memory.

14. A system as in claim 13 wherein the device is a register which may be subjected to program control such that the respective value generated with the device can be changed and thereby shift the relative position of the internal memory of the data processing unit within the external address continuum.

15. A system as in claim 14 wherein the device is a register which may be subjected to program control such that the respective value generated with the device can be changed and thereby shift the relative position of the internal memory of the data processing unit within the external address continuum.

16. An improved information processing system having a plurality of data processing units and a common multiple line bus interconnecting the units to allow communication of information between the units, the improvement comprising in combination:
each data processing unit including
  (a) an internal memory provided with a plurality of uniquely addressed storage locations within an internal address range associated therewith beginning with internal address zero, and also within an external address range which is part of an external address continuum having external addresses which are associated with and used to identify the storage locations in the internal memories of the plurality of data processing units, including the starting locations and ending locations of the internal memories within the continuum,
  (b) address generating means for providing access to its own internal memory and access to the internal memories of the other units, with both such accesses being accomplished by generating an external address of a particular storage location to be accessed, and by determining whether this generated external address is outside the external address range of its own memory, and
  (c) means for receiving external addresses from the bus, including means for determining whether each received external address corresponds to an address within the external address range of its own internal memory, said determining means including means for subtracting from each received external address the value corresponding to the external address of the starting storage location of its own internal memory unit.

17. A system as in claim 16 wherein in each data processing unit the determining means also includes means for comparing the result of its subraction with the internal address range of its own internal memory, and means for enabling internal memory access to its own internal memory when the result is within such internal address range.

18. A system as in claim 16 wherein in each data processing unit the address generating means includes means for determining whether the generated external address is outside of the external address range of its own internal memory by comparing the generated external address to first and second values respectively corresponding to the external addresses of the starting location of and the ending location of its own internal memory, means for enabling access to its own internal memory when such comparison indicates the generated external address is within the external address range of its own internal memory, and means for enabling access the bus to thereby allow the generated external address to be applied to the bus when such comparison indicates the generated external address is outside of the external address range of its own internal memory.

19. A system as in claim 16 wherein in each data processing unit the address receiving means includes a device for generating a value corresponding to the external address of the starting storage location of its own internal memory.

20. A system as in claim 19 wherein the device is selected from the group of devices consisting of mechanical coding switches, electronic coding switches and registers.

* * * * *